United States Patent [19]
Kern

[11] 3,752,152
[45] Aug. 14, 1973

[54] EYE EXAMINATION DEVICE
[75] Inventor: Seymour P. Kern, Belleville, N.J.
[73] Assignee: Applied Life Design Corporation, Bloomfield, N.J.
[22] Filed: Feb. 16, 1972
[21] Appl. No.: 226,818

[52] U.S. Cl. ........................ 128/21, 128/2 T, 351/7
[51] Int. Cl. .............................................. A61b 1/00
[58] Field of Search ................ 128/21, 22, 10, 2 T, 128/145.5; 351/7

[56] References Cited
UNITED STATES PATENTS
2,255,689  9/1941  Taylor et al. ........................... 351/7
3,070,087  12/1962  Sittel .................... 128/2 T
3,658,058  4/1972  Neidhart ........................ 128/145.5

FOREIGN PATENTS OR APPLICATIONS
1,506,352  11/1967  France .................. 128/2 T Primary Examiner—Aldrich F. Medbery
Attorney—Bruce M. Eisen

[57]   ABSTRACT

Disclosed herein is a simple, eyelid-supportable device useful for painlessly examining the upper conjunctival sac of the eye.

5 Claims, 3 Drawing Figures

PATENTED AUG 14 1973  3,752,152
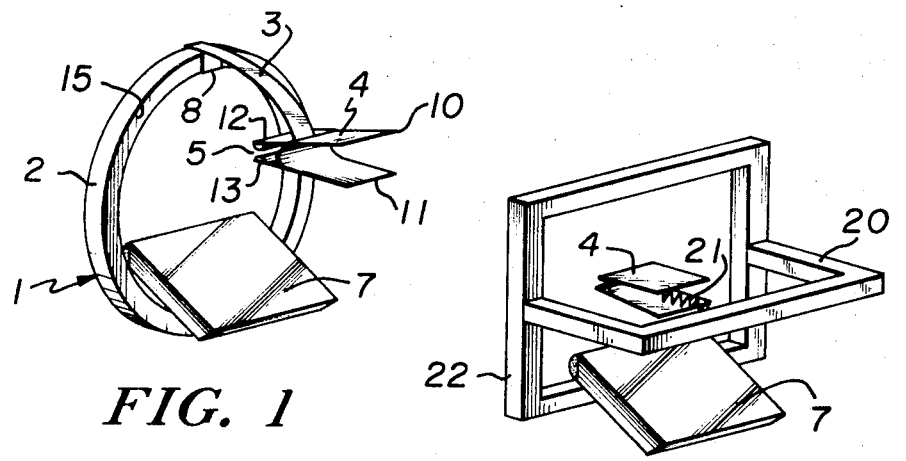
FIG. 1
FIG. 3
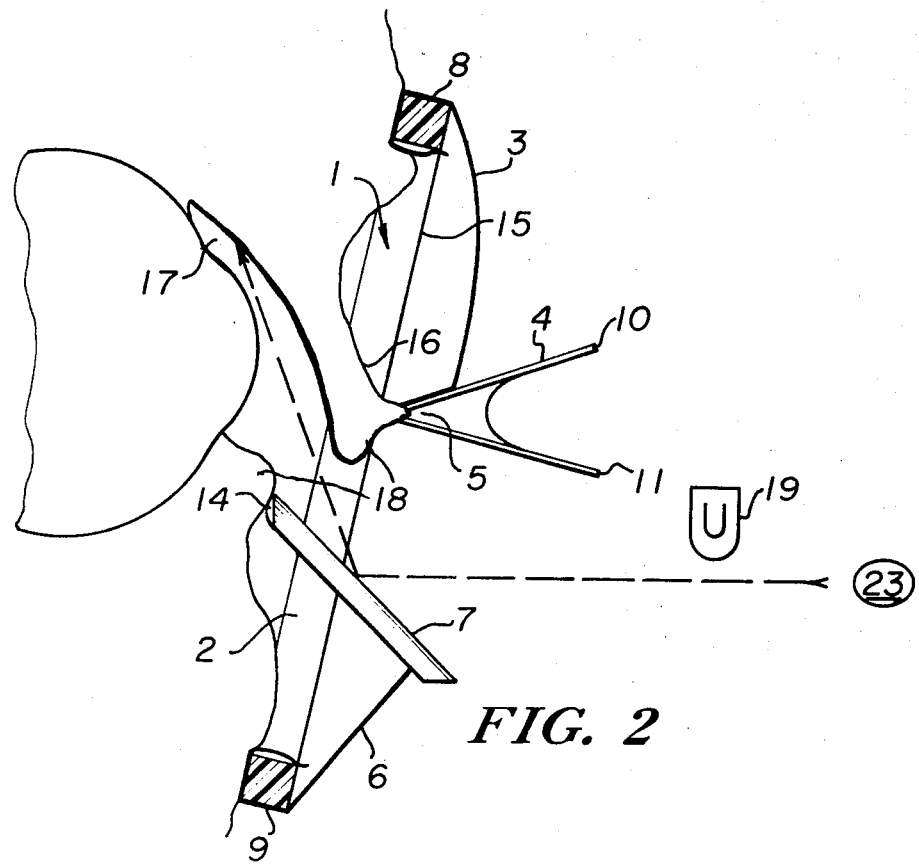
FIG. 2

3,752,152

EYE EXAMINATION DEVICE

This invention relates to a device useful in the art of eye examination. More specifically, it relates to a simple, portable, inexpensive instrument which permits viewing of the upper conjunctival sac without appreciable discomfort to the patient and allows the examiner use of both hands.

Despite increasingly sophisticated electronic devices for objective examination of the eye, there exists no satisfactory means for examination of the upper eyelid fornix and surrounding areas. Inspection of these areas is particularly important in cases of foreign bodies, infection and allergy. Present techniques designed to view these areas involve eversion of the upper eyelid and hence have serious drawbacks. Single eversion of the upper lid requires pressure above the upper eyelid and counter traction on the eye lashes. This procedure is usually uncomfortable to an adult and terrifying to a child. Moreover, such folding of the lid distorts the tissue and may prevent viewing of the true situation. Furthermore, the surface area viewable by such folding is generally limited to a narrow band of tissue. Most of the fornix anatomy remains hidden under the lid fold. While double eversion of the lid permits viewing of the entire fornix, this technique is highly uncomfortable even under topical anesthesia. The problems in subjecting a child to double eversion are readily apparent. In addition, such eversion methods often increase intraocular pressure in the globe which, in some cases, could result in eye damage, for example in an eye with an occult perforation.

I have now invented a simple, portable, inexpensive device which readily permits viewing of the entire fornix area without appreciable pain or discomfort to the patient.

This self-supportable device broadly comprises a frame having a back side adopted to closely face and surround the eye, and having a first spring means on the front side affixed to said frame at its upper portion and a second spring means affixed to said frame at its lower portion; said first spring means having affixed thereto means protrudable from the front side of the frame into the eye and adapted to temporarily secure itself to areolar skin of the upper eye lid and pull it toward said front side; said second spring means having affixed thereto a mirror mountable at an angle sufficient to permit viewing of the fornix region from the front side of said frame.

It has been found that the device of this invention permits full, non-distorted viewing of the conjunctival region of the eye, i.e., the marginal, tarsal, orbital, fornix, bulbar and limbal areas. This device surprisingly does not interfere with viewing of the desired areas. Even more surprising is the fact that this device causes no significant pain or discomfort in use and thus is particularly suitable for examining children. Moreover, it does not significantly increase intraocular pressure. Since it is compact, lightweight, inexpensive and does not require an electrical energy source, it is eminently suited for eye examination at locations remote from standard medical facilities. It can easily be carried in a physician's bag. Since the device is self-supportable, it permits the physician use of both hands. It can be rapidly attached, requiring only seconds between taking the device from its storage area and rendering it serviceable.

The device of this invention can be used in connection with any light source, i.e., natural light, a flashlight, a slit lamp or fiber optics. It will find particular use in conjunction with the standard slit lamp found in virtually all opthamologists' offices.

The subject device and its usage may be more fully understood by reference to the appended Figures;

FIG. 1 is a perspective view of a preferred embodiment.

FIG. 2 is a side schematic cross-sectional view of the device of FIG. 1 being utilized in the examination of the fornix area of the eye of a patient.

FIG. 3 is a perspective view of an exemplary alternative embodiment.

The frame can be of any geometry, e.g., circular, elliptical, oval, square, and rectangular, so long at it surrounds the eye. Preferably it is seated over the bony orbital rim. FIG. 1 illustrates a circular frame and FIG. 3 illustrates a rectangular frame. The frame need not completely enclose the eye — for example, a small arc of a circular frame could be omitted. The frame may even have structural extensions on which one or both spring means may be attached as exemplified by the embodiment depicted in FIG. 3. The frame can be fabricated from plastic, metal or similarly suitable material.

In the preferred embodiment depicted in FIGS. 1 and 2, a circular frame 1 is employed having a diameter of about 2⅛ inches. The side edge 2 of the rim can conveniently have a thickness of about one-eighth inch. The front side rim 15 can also be about one-eighth inch. The spring means 3 attached to the upper part of frame 1 is suitably a resilient metallic strip such as tempered berylium copper or stainless spring steel and can be about one-fourth to one-half inch. It can be conveniently affixed to the rim merely by being folded or crimped around the rim as at 8 and held in place by friction. Attached to the opposite end of spring 3 is a clip 4 which is also conveniently fabricated from a resilient metal strip. The clip 4 can be joined to spring 3 by adhesive, molding, or even by crimping the end of one into a folded section of the other. The clip has means, such as ends 10 and 11 connected by a resilient strip, to temporarily create a large gap between opposite strip ends 12 and 13 whereby supple tissue can readily fit and become trapped and secured when the finger pressure on ends 10 and 11 is released thereby causing gap 5 to decrease and secure areolar skin therein. Smooth plastic surfaces or felt pads 12 and 13 are adhesively attached to the inside edges of the clip ends to provide cushioning means in gap 5.

Spring means 6 is also conveniently a resilient metallic strip which can be affixed to the lower portion of frame 1 as at 9 in the same or different means as spring 3. The back edge 14 of mirror element 7 can be conveniently adhesively mounted on a folded section of spring strip 6. The mirror front surface is preferably aluminum coated. The back edge 14 of the mirror is also provided with an adhesively attached smooth plastic surface or felt pad to provide cushioning.

The device can be affixed in the position depicted in FIG. 2 as follows:

The patient is instructed to gently close his eyes. The frame 1 is placed over the eye to be examined with the cushioned back edge 14 of the mirror 7 just below the lower eyelid 18. The clip ends 10 and 11 are grasped and squeezed between the index finger and thumb enlarging gap 5. The clip is moved so that the supple areolar skin 16 just above the lid margin is trapped in gap 5 by releasing the finger pressure. The frame is now self-supporting. The spring 3 will pull clip 4 and its captive areolar tissue away from the eye globe toward the front side 15 of the frame allowing indirect visualization of the upper fornix 17. The examiner will focus a light beam on the mirror surface 7 which will thus illuminate the upper fornix area. This light beam can come from any suitable source 19 such as a flashlight or slit lamp. The examiner then views the desired area from position 23 either with his naked eye or aided by standard optics. In a preferred examination procedure, the patient is instructed to look down at his toes, then down to the right and then to the left thereby enabling the entire upper fornix, including the conjunctive of the lid and globe, to be visualized.

Another embodiment of the device of this invention is depicted in FIG. 3 wherein the rectangular frame 22 includes as a structural extension a handlebar 20 to which is affixed spring means 21 which is a coil spring. A clip of the type described above is affixed at the other end of the coil spring. The mirror and its support means can also be of the type described above.

The spring means 3 and 6 can either be permanently affixed to the same point on the frame (e.g., a tight friction fit) or can be slidably affixed (e.g., a loose friction fit). In certain situations it may be desirable to concentrate on only one side of the fornix, and in such instances a slidable clip and mirror means would be advantageous. In view of the obvious disparities in size and strength of the eyelid between a large adult and a small child, the examiner could have two or more such devices differing in comparative size and spring strength. Alternately, one or both spring means could be made detachable in obvious ways from the frame and replaceable with corresponding elements more suitably scaled to the patient under examination. Such detachability could be readily effected in several ways, e.g., by applying pressure on spring means attached by a friction fit or by having a gap in the frame large enough to allow slidable spring means to pass through.

In place of a clip, other means can be used to secure the spring means to the areolar tissue, as for example, a pad impregnated with a dermatologically acceptable pressure sensitive conventional adhesive. Such adhesive pad shave great holding power yet can be readily removed by peeling.

In still further variants, the frame could readily be adapted to carry magnification means. The mirror element can be concave or convex and the magnification means can comprise a concave or convex lens. Devices of this invention can also be readily adapted by known circuitry to carry their own lightweight light sources, e.g., a battery-powered fiber optic system either as part of or separate from the frame.

Numerous other variants of the subject device within the scope of this invention will be apparent to one skilled in the art.

What is claimed is:

1. A self-supportable device for painless examination of the fornix region of the eye comprising a frame having a back side adapted to closely face and surround said eye, and having a first spring support means on the front side affixed to said frame at its upper portion and a second spring support means affixed to said frame at its lower portion; said first spring means having affixed thereto holding means protrudable from the front side of the frame into the eye and adapted to temporarily secure itself to areolar skin of the upper eyelid and pull it toward said front side; said second spring means having affixed thereto a mirror mountable at an angle relative to the eye sufficient to permit viewing of the fornix from the front side of said frame.

2. A device according to claim 1 wherein at least one of said spring means is slidably affixed to said frame.

3. A device according to claim 1 wherein at least one of said spring means is a resilient metallic strip.

4. A device according to claim 1 wherein said frame is circular.

5. A device according to claim 1 wherein said holding means to temporarily secure areolar tissue comprises clips.

* * * * *